United States Patent
Brodjonegoro et al.

(10) Patent No.: US 12,378,637 B2
(45) Date of Patent: Aug. 5, 2025

(54) TREATMENT SYSTEM FOR THE SLAG PHASE AFTER REMOVING IRON-ALUMINUM-CHROMIUM FROM LEACHING SOLUTION OF LATERITE NICKEL ORE

(71) Applicants: PT ESG NEW ENERGY MATERIAL, Dki Jakarta (ID); PT QMB NEW ENERGY MATERIALS, Dki Jakarta (ID); GEM CO., LTD., Guangdong (CN); PT GEM INDONESIA NEW ENERGY MATERIALS, Dki Jakarta (ID)

(72) Inventors: Satryo Soemantri Brodjonegoro, Dki Jakarta (ID); Kaihua Xu, Guangdong (CN); Andi Syaputra Hasibuan, Dki Jakarta (ID); Emil Salim, Dki Jakarta (ID); Rizky Wanaldi, Dki Jakarta (ID); Tegar Mukti Aji, Dki Jakarta (ID); Piyan Rahmadi, Dki Jakarta (ID); Xiaodong Yan, Dki Jakarta (ID)

(73) Assignees: PT ESG NEW ENERGY MATERIAL, Jakarta Selatan (ID); PT QMB NEW ENERGY MATERIALS, Jakarta Selatan (ID); GEM CO., LTD., Shenzhen (CN); PT GEM INDONESIA NEW ENERGY MATERIALS, Jakarta Selatan (ID)

( * ) Notice: Subject to any disclaimer, the term of this patent is extended or adjusted under 35 U.S.C. 154(b) by 0 days.

(21) Appl. No.: 18/870,460

(22) PCT Filed: Jul. 31, 2023

(86) PCT No.: PCT/CN2023/110212
§ 371 (c)(1),
(2) Date: Nov. 29, 2024

(87) PCT Pub. No.: WO2025/025050
PCT Pub. Date: Feb. 6, 2025

(65) Prior Publication Data
US 2025/0163542 A1 May 22, 2025

(51) Int. Cl.
*C22B 23/06* (2006.01)
*C22B 3/00* (2006.01)

(52) U.S. Cl.
CPC .......... *C22B 23/06* (2013.01); *C22B 23/0407* (2013.01)

(58) Field of Classification Search
CPC ..... C22B 23/06; C22B 23/0407; C22B 23/04; C22B 3/02; C22B 3/06; C22B 23/0415;
(Continued)

(56) References Cited

U.S. PATENT DOCUMENTS 6,391,089 B1 * 5/2002 Curlook ................ C22B 23/043
423/150.3
7,422,621 B2 * 9/2008 Ando .................... C22B 11/044
75/426
(Continued)

FOREIGN PATENT DOCUMENTS

| CN | 103614571 A | 3/2014 |
| CN | 110331283 A | 10/2019 |

(Continued)

OTHER PUBLICATIONS

CN110331283, Li et al., Processing Method Of Laterite Nickel Ore Acid Leaching Residue, Aug. 31, 2021 (Year: 2021).*
(Continued)

*Primary Examiner* — Jessee R Roe
*Assistant Examiner* — Michael Aboagye (57) ABSTRACT

Disclosed is a treatment system for the slag phase after removing iron-aluminum-chromium from leaching solution
(Continued)

of laterite nickel ore, comprising a filtering module, a refining module, a feeding module, and a measurement module. The filtering module comprises a material suction component and a filtering assembly. The filtering assembly is connected to the outlet of the material suction component and features a filter residue outlet and a filtrate outlet. The refining module is connected to the filter residue outlet. The feeding module consists of a material pipe and a material guiding drive component. The material pipe has an inlet end connected to the outlet of the refining module. This setup enables the timely filtration of the generated slag phase, followed by refinement processing, and allows for the controlled metering of the returned filter residue. Consequently, it enhances the subsequent acid leaching and dissolution efficiency of the slag phase.

10 Claims, 5 Drawing Sheets

(58) Field of Classification Search
CPC ...... C22B 23/0453; C22B 3/22; G05D 21/02; B02C 4/08
USPC ............... 266/44, 90, 114; 75/425, 743, 738
See application file for complete search history.

(56) References Cited

U.S. PATENT DOCUMENTS

| | | | |
|---|---|---|---|
| 8,911,531 B2* | 12/2014 | Nakai | ............... C22B 3/02 |
| | | | 75/425 |
| 9,938,158 B2* | 4/2018 | Ozaki | ............... C01B 17/96 |
| 2016/0024614 A1* | 1/2016 | Matsubara | ......... C22B 23/0461 |
| | | | 75/743 |

FOREIGN PATENT DOCUMENTS

| | | |
|---|---|---|
| CN | 111187921 A | 5/2020 |
| CN | 114225545 A | 3/2022 |
| CN | 218132181 U | 12/2022 |
| JP | 2020132982 A | 8/2020 |

OTHER PUBLICATIONS

CN218132181, Wang, Nickel Iron Slag Recycling Crushing Device, Dec. 27, 2022 (Year: 2022).*

International Search Report issued in corresponding International application No. PCT/CN2023/110212, mailed Dec. 14, 2023 (9 pages).

Written Opinion of the International Search Authority in corresponding International application No. PCT/CN2023/110212, mailed Dec. 14, 2023 (8 pages).

* cited by examiner

FIG. 5
TREATMENT SYSTEM FOR THE SLAG PHASE AFTER REMOVING IRON-ALUMINUM-CHROMIUM FROM LEACHING SOLUTION OF LATERITE NICKEL ORE

FIELD OF THE DISCLOSURE

The disclosure relates to the technical field of slag phase treatment of laterite nickel ore, in particular to a treatment system for the slag phase after removing iron-aluminum-chromium from leaching solution of laterite nickel ore.

BACKGROUND

Laterite nickel ore is a type of surface weathered crust deposit formed through weathering, leaching, and deposition of nickel sulfide ore rock masses. Globally, laterite nickel ore deposits are distributed in tropical countries within 30 degrees north and south of the equator, and are concentrated in the tropical to subtropical regions surrounding the Pacific Ocean. The main countries with such deposits include Cuba and Brazil in the Americas, Indonesia and the Philippines in Southeast Asia, and Australia, New Caledonia, and Papua New Guinea in Oceania.

After processing, laterite nickel ore contains significant amounts of nickel, chromium, and manganese. Discarding them would result in substantial losses of nickel, cobalt, and manganese. A Chinese patent CN110331283B discloses a method for treating acid leaching residue from laterite nickel ore. After the first-stage of removing iron-aluminum, calcium hydroxide is used to adjust the pH of the first-stage iron-aluminum removed solution to 4.2-4.5 for the second-stage of removing iron-aluminum, yielding second-stage iron-aluminum residue and second-stage iron-aluminum removed solution. Nickel and cobalt precipitations are then performed on the second-stage iron-aluminum removed solution to obtain nickel-cobalt precipitated lean solution and nickel-cobalt precipitate. The nickel-cobalt precipitated lean solution is then subjected to manganese and magnesium precipitation in steps, resulting in manganese residue and magnesium residue. Finally, the second-stage iron-aluminum residues are returned to the pressurized acid leaching process. Typically, a circulating leaching pulp neutralization unit is used to neutralize excess acid in the leaching solution, and a multi-stage removing iron-aluminum-chromium unit is employed to purify the liquid phase of the leaching solution. The second-stage and subsequent slag phase generated in the multi-stage removing iron-aluminum-chromium unit are returned to the circulating leaching pulp neutralization unit for re-acid leaching. However, the slag phase produced during the removing iron-aluminum-chromium process may contain larger particles, which hinder its subsequent reaction with acidic pulp and affect the recovery and utilization efficiency of the slag phase.

SUMMARY

The purpose of this disclosure is to provide a treatment system for the slag phase after removing iron-aluminum-chromium from leaching solution of laterite nickel ore to solve the technical problem of low recovery efficiency of slag phase generated in the process of removing iron, aluminum, and chromium in existing technology.

In order to solve the above technical problems, this disclosure provides a treatment system for the slag phase after removing iron-aluminum-chromium from leaching solution of laterite nickel ore, comprising:

a filtering module, which comprises a material suction component and a filtering assembly; the material suction component is positioned within a slag phase sedimentation zone of a multi-stage removing iron-aluminum-chromium unit, with its material suction inlet connected to the slag phase sedimentation zone, for extracting the slag phase generated within the multi-stage removing iron-aluminum-chromium unit; the filtering assembly is connected to the outlet of the material suction component and is used to filter the slag phase; the filtering assembly has a filter residue outlet and a filtrate outlet that connects back to the multi-stage removing iron-aluminum-chromium unit;

a refining module, which is connected to the filter residue outlet and is used for crushing the filter residue; and, a feeding module, which comprises a material pipe and a material guiding drive component; the material pipe has a feed inlet connected to the outlet of the refining module and a discharge outlet connected to a neutralization unit for cyclic leaching ore pulp; the material guiding drive component is located inside the material pipe and is used to convey the slag phase into the neutralization unit for cyclic leaching ore pulp.

In some embodiments, the material suction component comprises a suction pipe and a suction pump; the suction pipe is internally installed in the slag phase sedimentation zone within the multi-stage removing iron-aluminum-chromium unit, specifically in the equipment of the multiple sub-units following the first one; the suction pipe is positioned at the bottom of the equipment, with multiple suction inlets uniformly arranged along its length on the lower side and connected to the interior of the equipment; the inlet of the suction pump is connected to the suction pipe through a first connecting pipe, and its outlet is connected to the interior of the inner cylinder of the filtering assembly through a second connecting pipe.

In some embodiments, the filtering assembly comprises an outer cylinder, an inner cylinder, a liquid collection tank, a first spiral conveyor rod, and a first motor; the outer cylinder is inclined; the inner cylinder is positioned inside the outer cylinder and is coaxial with it; the wall of the inner cylinder is uniformly provided with a plurality of filtration holes for filtering liquid, the lower end of the inner cylinder is connected to the outlet of the material suction component; the upper end of the inner cylinder is connected to the refining module; the liquid collection tank is sleeved over the lower end of the outer cylinder; an opening is provided on the bottom side of the outer cylinder, which is connected to the liquid collection tank; the first spiral conveyor rod is located within the inner cylinder and is rotatably connected to it; the first spiral conveyor rod extends from the bottom to the top of the inner cylinder; the drive shaft of the first motor is connected to the first spiral conveyor rod, enabling the first motor to drive the spiral conveyor rod to rotate inside the inner cylinder; the drive shaft of the first motor is connected to the first spiral conveyor rod for driving the rotation of the first spiral conveyor rod to transport the filter residue to the refining module.

In some embodiments, the refining module comprises a kettle body, a material crushing component, and an abrasive component, the material crushing component and the abrasive component arranged sequentially below the feed inlet of the kettle body; the material crushing component is used to crush the filter residue entering through the feed inlet, while the abrasive component is used to grind the crushed filter residue.

In some embodiments, the material crushing component comprises two crushing rollers and a driving mechanism; the two crushing rollers are arranged side by side and interconnected in a meshing manner; a crushing zone is formed between the two crushing rollers, corresponding to the feed inlet of the kettle body and used for crushing the filter residue; the driving mechanism is used to drive the two crushing rollers to rotate relative to each other.

In some embodiments, the middle section of the outer wall of the kettle body is inwardly concave to form an inwardly tapering cylindrical body; The inwardly tapering cylindrical body is located between the material crushing component and the abrasive component; upper end of the inwardly tapering cylindrical body connects with the inner wall of the kettle body to form a converging passage with a cross-sectional area that decreases sequentially from top to bottom; lower end of the inwardly tapering cylindrical body connects with the inner wall of the kettle body to form a diverging passage with a cross-sectional area that increases sequentially from top to bottom; the abrasive component comprises a grinding roller and a third motor; the grinding roller is located within the diverging passage; the outer peripheral surface of the grinding roller is spaced apart from the inner wall of the kettle body to form a grinding area between them; the drive shaft of the third motor is connected to the grinding roller to drive its rotation, thereby refining the filter residue that passes through the grinding area.

In some embodiments, the material guiding drive component comprises a second spiral conveyor rod and a second motor; the second spiral conveyor rod is horizontally disposed within the material pipe; the drive shaft of the second motor is fixedly connected to the central axis of the second spiral conveyor rod to drive the second spiral conveyor rod to rotate and output the filter residue inside the material pipe through its discharge end.

In some embodiments, a material passing cylinder is provided at the outlet end of the material pipe; one side of the material passing cylinder is connected to the material pipe, and its bottom end is connected to the neutralization unit for cyclic leaching ore pulp; a valve is installed within the material passing cylinder, the valve is connected to the measurement module, when the measurement module detects that the pH value reaches a set value, the valve closes.

In some embodiments, the treatment system also comprises a measurement module, the measurement module is connected to the material guiding drive component and the neutralization unit for cyclic leaching ore pulp; the measurement module is used to obtain the pH value of the ore pulp within the neutralization unit for cyclic leaching ore pulp and, when the detected pH value reaches a preset value, to control the material guiding drive component to stop feeding.

In some embodiments, the measurement module comprises a pH detector and a processor; the pH detector is installed in the neutralization unit for cyclic leaching ore pulp to detect the pH value of the ore pulp within the unit; the processor is electrically connected to the material guiding drive component and the pH detector; when the pH value detected by the pH detector is less than a preset value, the second motor operates normally, driving the second spiral conveyor rod to rotate and feed material; when the pH value detected by the pH detector reaches or exceeds the preset value, the processor controls the material guiding drive component to stop operating.

Compared with existing technologies, the beneficial effects of this disclosure are: by incorporating the filtering module and the refining module, the slag phase generated within the multi-stage removing iron-aluminum-chromium unit can be effectively processed. The material suction component, positioned within the slag phase sedimentation area of the multi-stage removing iron-aluminum-chromium unit, allows for timely extraction of the sediments during the ore pulp processing. These sediments are then transported to the filtering assembly for solid-liquid separation. After separation, the filtrate is returned to the multi-stage removing iron-aluminum-chromium unit for further reaction, while the filter residue is discharged into the refining module. Within the refining module, the large particles in the filter residue are crushed, resulting in a uniform and finer particle size distribution. This refinement facilitates thorough reaction between the slag phase and acidic ore pulp during subsequent reuse, thereby enhancing the efficiency of slag phase recycling.

Furthermore, through the feeding module and measurement module, the pH value of the ore pulp within the neutralization unit for cyclic leaching ore pulp is obtained by the measurement module. When the detected pH value reaches a preset value, the material guiding drive component is controlled to stop feeding into the neutralization unit for cyclic leaching ore pulp. Quantity control is then implemented based on the returned filter residue, further enhancing the subsequent acid leaching and dissolution efficiency of the slag phase.

DETAILED DESCRIPTION OF PREFERRED EMBODIMENTS

In order to further clarify the purpose, technical solution, and advantages of this disclosure, the following will provide a detailed explanation of this disclosure in conjunction with the accompanying drawings and embodiments. It should be understood that the specific embodiments described herein are only used to explain this disclosure and are not intended to limit this disclosure.

Before elaborating on the embodiments, this disclosure first provides explanations for some of the terminology used within the text.

In the description of this application, "electrical connection" primarily refers to a connection mode capable of exchanging data, which includes both physical connections via cables and wireless connections. The specific type of connection mode employed is a prior art that can be understood and envisioned by those skilled in the art, and thus will not be explained excessively herein.

In the description of this application, "plurality" means two or more, unless otherwise specifically and concretely defined.

When "embodiment" is mentioned in this document, it implies that the specific features, structures, or characteristics described in conjunction with the embodiment can be included in at least one embodiment of this disclosure. The appearance of this phrase at various locations in the specification does not necessarily refer to the same embodiment, nor does it imply an independent or alternative embodiment that is mutually exclusive with other embodiments. Those skilled in the art understand explicitly and implicitly that the embodiments described herein can be combined with other embodiments.

As shown in FIG. 1 to FIG. 5, this disclosure provides a treatment system for the slag phase after removing iron-aluminum-chromium from leaching solution of laterite nickel ore. The system comprises a filtering module 1, a refining module 2, a feeding module 3, and a measurement module 4.

Figure 1:
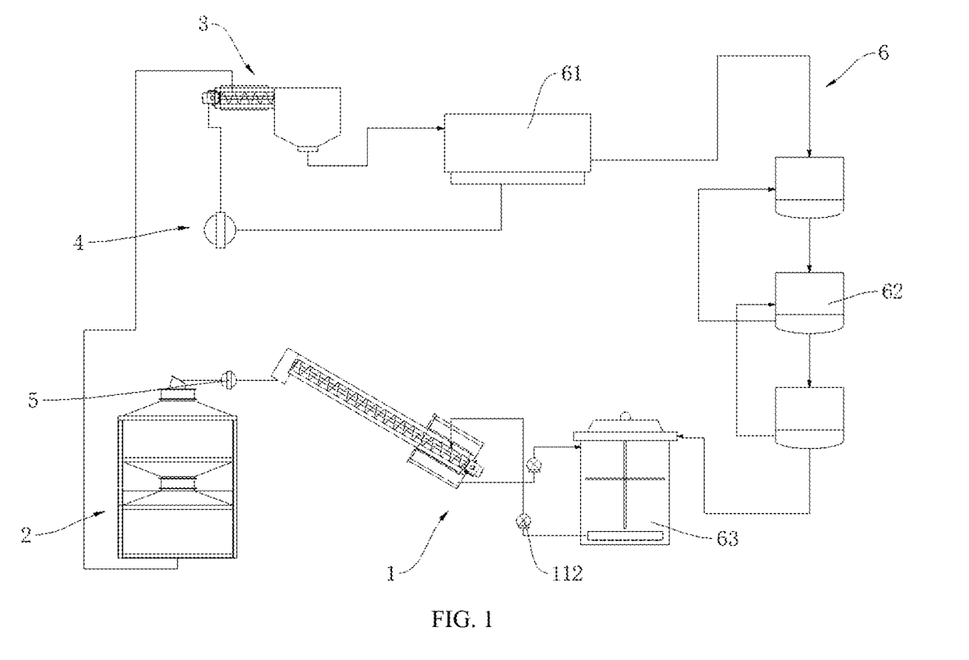
FIG. 1 is a schematic diagram illustrating the structure of an embodiment of the treatment system for slag phase generated during the removing iron-aluminum-chromium process from laterite nickel ore leaching solution, as provided by this disclosure.

The filtering module 1 comprises a material suction component 11 and a filtering assembly 12. The material suction component 11 is positioned within a slag phase sedimentation zone 63a of a multi-stage removing iron-aluminum-chromium unit 63, with its material suction inlet connected to the slag phase sedimentation zone63a, for extracting the slag phase generated within the multi-stage removing iron-aluminum-chromium unit 63. The filtering assembly 12 is connected to the outlet of the material suction component 11 and is used to filter the slag phase. The filtering assembly 12 has a filter residue outlet 12a and a filtrate outlet 12b that connects to the multi-stage removing iron-aluminum-chromium unit 63.

The refining module 2 is connected to the filter residue outlet 12a and is used for crushing the filter residue.

The feeding module 3 comprises a material pipe 31 and a material guiding drive component 32. The material pipe 31 has a feed inlet 31a connected to the outlet of the refining module 2 and a discharge outlet 31b connected to a neutralization unit for cyclic leaching ore pulp 61. The material guiding drive component 32 is located inside the material pipe 31 and is used to convey the slag phase into the neutralization unit for cyclic leaching ore pulp 61.

The measurement module 4 is connected to the material guiding drive component 32 and the neutralization unit for cyclic leaching ore pulp 61. It is used to obtain the pH value of the ore pulp within the neutralization unit for cyclic leaching ore pulp 61 and, when the detected pH value reaches a preset value, to control the material guiding drive component 32 to stop feeding.

In this device, the slag phase generated in the multi-stage removing iron-aluminum-chromium unit 63 is suctioned out by the material suction component 11 and then directed into the filtering assembly 12. After solid-liquid separation through the filtering process of the filtering assembly 12, the filtered liquid is recirculated back into the multi-stage removing iron-aluminum-chromium unit 63, while the filter residue is discharged into the refining module 2. After being crushed in the refining module 2, the filter residue is introduced into the material pipe 31 and sequentially conveyed into the neutralization unit for cyclic leaching ore pulp 61 by the driving force of the material guiding drive component 32. When the measurement module 4 detects that the pH value of the ore pulp in the neutralization unit for cyclic leaching ore pulp 61 reaches a preset value, it triggers a signal to control the material guiding drive component 32 to stop feeding. This allows for the regulation of the amount of slag phase introduced based on the pH value of the ore pulp in the neutralization unit for cyclic leaching ore pulp 61.

It should be noted that the removing iron-aluminum-chromium section of the laterite nickel ore leaching solution specifically comprises a neutralization and impurity removal module 6. The neutralization and impurity removal module 6 comprises a neutralization unit for cyclic leaching ore pulp 61, a multi-stage countercurrent washing unit 62, and a multi-stage removing iron-aluminum-chromium unit 63. The neutralization unit for cyclic leaching ore pulp 61 is used to neutralize excess acid in the leaching solution. The multi-stage countercurrent washing unit 62 is connected to the neutralization unit for cyclic leaching ore pulp 61 and is used to wash the neutralized leaching solution. The multi-stage removing iron-aluminum-chromium unit 63 is connected to the multi-stage countercurrent washing unit 62 and is used to remove impurities from the liquid phase of the leaching solution after washing by the multi-stage countercurrent washing unit 62. The method of removing impurities involves adding a neutralizing agent to gradually increase the pH value.

The multi-stage removing iron-aluminum-chromium unit 63 comprises multiple iron-aluminum-chromium removal sub-units connected in sequence, with the pH value of impurity removal solution gradually increasing in each sub-unit. Specifically, the first sub-unit has the solution with the lowest pH value. Experimental tests have shown that the slag phase produced in the first sub-unit mainly contains iron, aluminum, and chromium, with minimal nickel, cobalt, and manganese. Therefore, the slag phase from the first sub-unit can be discarded as tailings. However, the slag phase produced in the other sub-units contains iron, aluminum, nickel, and cobalt, with significant amounts of nickel, chromium, and manganese that cannot be ignored. This slag phase can be directed into the neutralization unit for cyclic leaching ore pulp 61 for acid leaching and dissolution.

Therefore, this device is primarily designed to process the slag phase produced by the subsequent multi-stage iron-aluminum-chromium removal sub-units after the first-stage iron-aluminum-chromium removal sub-unit. Correspondingly, the multi-stage removing iron-aluminum-chromium unit 63 comprises multiple sequentially connected iron-aluminum-chromium removal sub-units, and multiple material suction components 11 are provided, each correspondingly set in the multi-stage iron-aluminum-chromium removal sub-unit following the first one.

Figure 3:
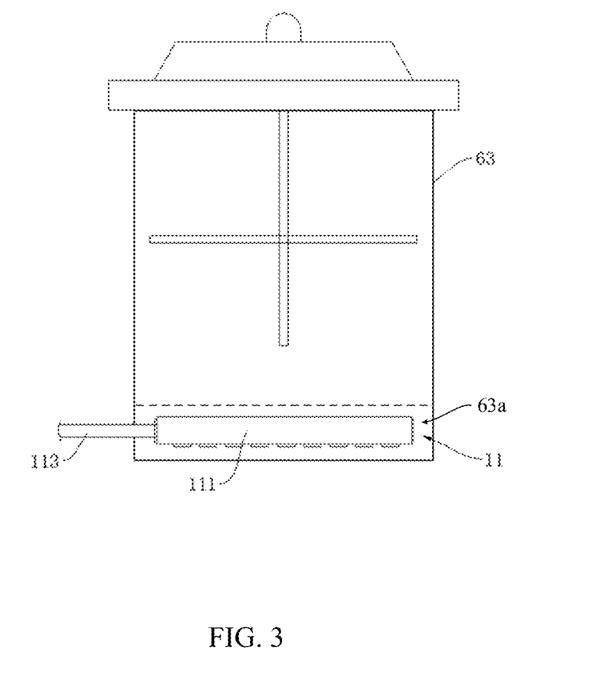
FIG. 3 is a schematic diagram illustrating the structure of the material suction component of the treatment system for slag phase generated during the removing iron-aluminum-chromium process from laterite nickel ore leaching solution shown in FIG. 1.

In some embodiments, as shown in FIG. 3, the material suction component 11 comprises a suction pipe 111 and a suction pump 112. The suction pipe 111 is internally installed in the slag phase sedimentation zone 63a within the multi-stage removing iron-aluminum-chromium unit 63, specifically in the equipment of the multiple sub-units following the first one. The suction pipe 111 is positioned at the bottom of the equipment, with multiple suction inlets uniformly arranged along its length on the lower side and connected to the interior of the equipment. The inlet of the suction pump 112 is connected to the suction pipe 111 through a first connecting pipe 113, and its outlet is connected to the interior of the inner cylinder 122 of the filtering assembly 12 through a second connecting pipe 114. When in use, by starting the suction pump 112, the slag phase precipitated at the bottom of the equipment in the multiple iron-aluminum-chromium removal sub-units can be suctioned out through the first connecting pipe 113 and the suction inlets of the suction pipe 111, and then delivered into the filtering assembly 12 through the second connecting pipe 114.

Figure 2:
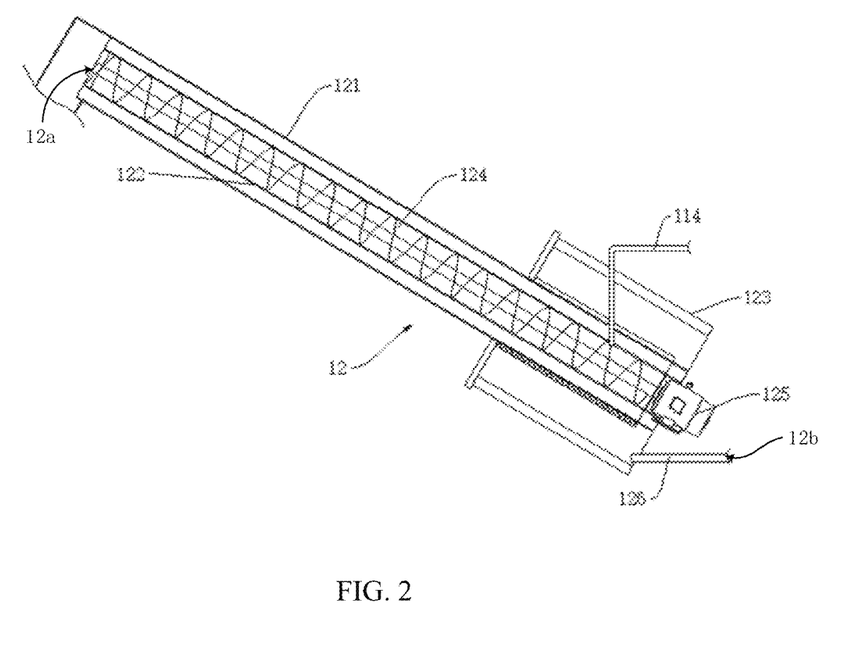
FIG. 2 is a schematic diagram illustrating the structure of the filtering assembly of the treatment system for slag phase generated during the removing iron-aluminum-chromium process from laterite nickel ore leaching solution shown in FIG. 1.

In some embodiments, as shown in FIG. 2, the filtering assembly 12 is provided in one or more configurations. When one filtering assembly 12 is provided, it is connected to the outlets of multiple material suction components 11. When multiple filtering assemblies 12 are provided, each is connected to a corresponding material suction component 11, enabling comprehensive or categorized processing of the slag phase generated in multiple stages. The filtering assembly 12 comprises an outer cylinder 121, an inner cylinder 122, a liquid collection tank 123, a first spiral conveyor rod 124, and a first motor 125. The outer cylinder 121 is inclined. The inner cylinder 122 is positioned inside the outer cylinder 121 and is coaxial with it. The wall of the inner cylinder 122 is uniformly provided with a plurality of filtration holes for filtering liquid, allowing liquid substances contained in the inner cylinder 122 to pass through the filtration holes into the interlayer space between the inner cylinder 122 and the outer cylinder 121. Additionally, the lower end of the inner cylinder 122 is connected to the outlet of the material suction component 11, specifically to one end of the second connecting pipe 114, so that the material extracted by the material suction component 11 is fed into the bottom of the inner cylinder 122. The upper end of the inner cylinder 122 is connected to the refining module 2. The liquid collection tank 123 is sleeved over the lower end of the outer cylinder 121. After the material residue passes through the filtration holes and flows into the interlayer space between the inner cylinder 122 and the outer cylinder 121, it converges into the liquid collection tank 123 through an opening on the bottom side of the outer cylinder 121, which is connected to the liquid collection tank 123.

The first spiral conveyor rod 124 is located within the inner cylinder 122 and is rotatably connected to it. The drive shaft of the first motor 125 is connected to the first spiral conveyor rod, enabling the first motor 125 to drive the spiral conveyor rod to rotate inside the inner cylinder 122. The first spiral conveyor rod 124 extends from the bottom to the top of the inner cylinder 122. During its rotation, it conveys material from the bottom of the inner cylinder 122 to its top, facilitating the transport of filter residue to the refining module 2. Additionally, it has the capability to disperse the filter residue during conveyance, ensuring thorough filtration of any liquid entrapped within the filter residue.

Furthermore, the bottom of the liquid collection tank 123 is connected to a third connecting pipe 126. The third connecting pipe 126 is connected to a water pump and subsequently connected to a multi-stage removing iron-aluminum-chromium unit 63. With the aid of the water pump, the filtrate collected in the liquid collection tank 123 can be redirected back to the multi-stage removing iron-aluminum-chromium unit 63 for continued impurity removal treatment.

Furthermore, as shown in FIG. 1, in some embodiments, a material passing valve 5 is installed between the filter residue outlet 12a of the filtering assembly 12 and the refining module 2. By closing the material passing valve 5, the supply of material to the refining module 2 can be promptly halted, preventing an excessive accumulation of material within the refining module 2 that could lead to clogging.

Figure 4:
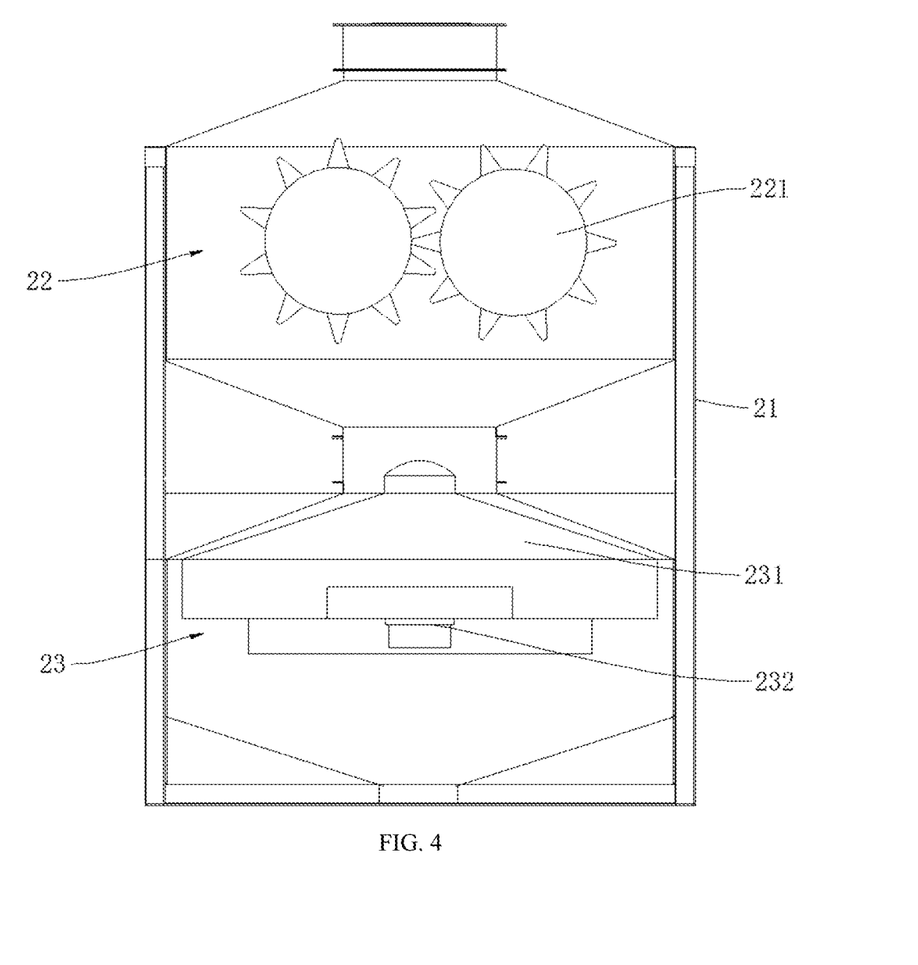
FIG. 4 is a schematic diagram illustrating the structure of the refining module of the treatment system for slag phase generated during the removing iron-aluminum-chromium process from laterite nickel ore leaching solution shown in FIG. 1.

As shown in FIG. 1 and FIG. 4, in some embodiments, to ensure the fineness of the material residue, the refining module 2 comprises a kettle body 21, a material crushing component 22, and an abrasive component 23, the material crushing component 22 and the abrasive component 23 arranged sequentially below the feed inlet of the kettle body 21. The material crushing component 22 is used to crush the filter residue entering through the feed inlet, while the abrasive component 23 is used to grind the crushed filter residue. By undergoing the crushing and grinding processes, a more refined material residue can be obtained.

Furthermore, the material crushing component 22 comprises two crushing rollers 221 and a driving mechanism. The two crushing rollers 221 are arranged side by side and interconnected in a meshing manner. Both ends of each crushing roller 221 are rotatably connected to the kettle body 21. A crushing zone is formed between the two crushing rollers 221, corresponding to the feed inlet of the kettle body 21 and used for crushing the filter residue. Preferably, the driving mechanism consists of two motors, each connected to one of the crushing rollers 221, capable of driving the two crushing rollers 221 to rotate relative to each other. This allows the material to be crushed and broken down by the two crushing rollers 221 once it enters the crushing zone between them.

Furthermore, the middle section of the outer wall of the kettle body 21 is inwardly recessed to form an inwardly tapering cylindrical body located between the material crushing component 22 and the abrasive component 23. The upper end of the inwardly tapering cylindrical body is connected to the inner wall of the kettle body 21 to form a converging passage with a cross-sectional area that decreases sequentially from top to bottom, which concentrates the material crushed by the material crushing component 22 towards the inwardly tapering cylindrical body. The lower end of the inwardly tapering cylindrical body is connected to the inner wall of the kettle body 21 to form a diverging passage with a cross-sectional area that increases sequentially from top to bottom. The abrasive component 23 comprises a grinding roller 231 and a third motor 232. The grinding roller 231 is located within the diverging passage, and the outer peripheral surface of the grinding roller 231 is spaced apart from the inner wall of the kettle body 21 to form a grinding zone between them. Material entering the inwardly tapering cylindrical body is directed towards the grinding zone, which has a width that decreases sequentially from top to bottom. The drive shaft of the third motor 232 is eccentrically connected to the grinding roller 231, so that when the third motor 232 drives the grinding roller 231 to rotate, the grinding roller 231 intermittently contacts and compresses the material against the inner wall of the kettle body 21, achieving grinding of the material residue.

Figure 5:
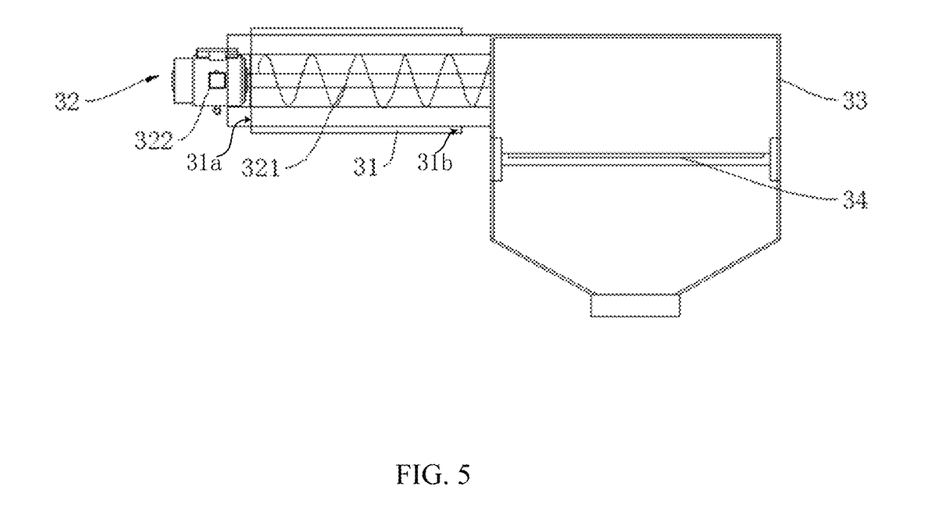
FIG. 5 is a schematic diagram illustrating the structure of the feeding module of the treatment system for slag phase generated during the removing iron-aluminum-chromium process from laterite nickel ore leaching solution shown in FIG. 1.

As shown in FIG. 1 and FIG. 5, in some embodiments, the discharge outlet 31b of the material pipe 31 can be directly connected to the neutralization unit for cyclic leaching ore pulp 61, while the feed inlet 31a of the material pipe 31 is located at the end opposite to the discharge outlet 31b. The material guiding drive component 32 comprises a second spiral conveyor rod 321 and a second motor 322. The second spiral conveyor rod 321 is horizontally disposed within the material pipe 31. The drive shaft of the second motor 322 is fixedly connected to the central axis of the second spiral conveyor rod 321, so that when the second motor 322 drives the second spiral conveyor rod 321 to rotate, it can convey the material entering the feed inlet 31a of the material pipe 31 towards its discharge outlet 31b, thereby exporting the filter residue to the neutralization unit for cyclic leaching ore pulp 61.

Furthermore, when the measurement module 4 drives the material guiding drive component 32 to stop, the speed of the second motor 322 will gradually decrease until it stops. Therefore, during the shutdown process of the second motor 322, it will still drive the spiral conveyor rod to rotate slowly and discharge the material. To avoid overfeeding filter residue from the material guiding drive component 32 to the neutralization unit for cyclic leaching ore pulp 61, in some embodiments, a material passing cylinder 33 is provided at the outlet end of the material pipe 31. One side of the material passing cylinder 33 is connected to the material pipe 31, and its bottom end is connected to the neutralization unit for cyclic leaching ore pulp 61. A valve 34 is installed within the material passing cylinder 33. During the stopping process of the material guiding drive component 32, the material will be directed into the material passing cylinder 33. The valve 34 is connected to the measurement module 4. When the measurement module 4 detects that the pH value reaches a set value, the valve 34 closes, retaining the material within the material passing cylinder 33.

In some embodiments, the measurement module 4 comprises a pH detector and a processor. The pH detector is installed in the neutralization unit for cyclic leaching ore pulp 61 to detect the pH value of the ore pulp within the unit. The processor is electrically connected to the second motor 322 of the material guiding drive component 32 and the pH detector. When the pH value detected by the pH detector is less than a preset value, the second motor 322 operates normally, driving the second spiral conveyor rod 321 to rotate and feed material. When the pH value detected by the pH detector reaches or exceeds the preset value, the processor controls the second motor 322 to stop operating.

The working principle of this disclosure is as follows: after slag phase is generated within the multi-stage removing iron-aluminum-chromium unit 63, the suction pump 112 is started to pump the slag phase from the multi-stage removing iron-aluminum-chromium unit 63 into the inner cylinder 122 through the first connecting pipe 113 and the second connecting pipe 114. The first motor 125 drives the first spiral conveyor rod 124 to rotate, conveying the filter residue towards the kettle body 21. During the conveyance, the filtrate is filtered through the inner cylinder 122 into the interlayer between the inner cylinder 122 and the outer cylinder 121, and then flows along the outer cylinder 121 into the liquid collection tank 123. The filtrate in the liquid collection tank 123 is pumped back to the multi-stage removing iron-aluminum-chromium unit 63 through a water pump and the third connecting pipe 126. After the filter residue is fed into the kettle body 21, it is crushed in the crushing zone between the two crushing rollers 221 and then further refined through a grinding zone before being directed into the material pipe 31. The second motor 322 drives the second spiral conveyor rod 321 to rotate, sequentially conveying the slag phase into the neutralization unit for cyclic leaching ore pulp 61. When the pH detector detects that the pH value of the ore pulp in the neutralization unit for cyclic leaching ore pulp 61 reaches the preset value, the processor triggers a signal to control the second motor 322 to stop, thereby halting the feeding of material into the neutralization unit for cyclic leaching ore pulp 61.

This disclosure achieves the processing of the slag phase generated within the multi-stage removing iron-aluminum-chromium unit 63 through the utilization of the filtering module 1 and the refining module 2. By positioning the material suction component 11 within the slag phase settlement area of the multi-stage removing iron-aluminum-chromium unit 63, it is possible to promptly extract the precipitate generated within the unit during the ore pulp processing and convey it to the filtering assembly 12 for filtration. After solid-liquid separation by the filtering assembly 12, the filtrate is returned to the multi-stage removing iron-aluminum-chromium unit 63 for further reaction, while the filter residue is discharged into the refining module 2. The refining module 2 crushes the large particles in the filter residue, resulting in a uniform and finely granulated filter residue. This facilitates thorough reaction between the slag phase and acidic ore pulp during subsequent reuse of the slag phase, thereby enhancing the efficiency of slag phase recycling and utilization.

This disclosure incorporates a feeding module 3 and a measurement module 4. The measurement module 4 is used to obtain the pH value of the ore pulp within the neutralization unit for cyclic leaching ore pulp 61. When the detected pH value reaches a preset value, the material guiding drive component 32 is controlled to stop feeding the neutralization unit for cyclic leaching ore pulp 61. By regulating the quantity of filter residue that is returned and utilized, this disclosure further enhances the subsequent acid leaching and dissolution efficiency of the slag phase.

The specific embodiments of this disclosure described above do not constitute limitations on the scope of protection of this disclosure. Any other corresponding changes and modifications made based on the technical concept of this disclosure shall be included within the scope of protection of the claims of this disclosure.

What is claimed is:

1. A treatment system for slag phase after removing iron-aluminum-chromium from leaching solution of laterite nickel ore, comprising:

a filtering module, which comprises a material suction component and a filtering assembly;

the material suction component is positioned within a slag phase sedimentation zone of a multi-stage removing iron-aluminum-chromium unit, with its material suction inlet connected to the slag phase sedimentation zone, for extracting the slag phase generated within the multi-stage removing iron-aluminum-chromium unit; wherein the slag phase includes iron, aluminum, cobalt, nickel, chromium, and manganese; the filtering assembly is connected to an outlet of the material suction component and is used to filter the slag phase; the filtering assembly has a filter residue outlet and a filtrate outlet that connects to the multi-stage removing iron-aluminum-chromium unit;

a refining module, which is connected to the filter residue outlet and is used for crushing the filter residue; and, a feeding module, which comprises a material pipe and a material guiding drive component;

the material pipe has a feed inlet connected to an outlet of the refining module and a discharge outlet connected to a neutralization unit for cyclic leaching ore pulp; the material guiding drive component is located inside the material pipe and is used to convey the slag phase into the neutralization unit for cyclic leaching ore pulp.

2. The treatment system for the slag phase after removing iron-aluminum-chromium from leaching solution of laterite nickel ore according to claim 1, wherein the material suction component comprises a suction pipe and a suction pump; the suction pipe is internally installed in the slag phase sedimentation zone within the multi-stage removing iron-aluminum-chromium unit; the suction pipe is provided with multiple suction inlets uniformly arranged along its length on a lower side; an inlet of the suction pump is connected to the suction pipe through a first connecting pipe, and an outlet of the suction pump is connected to an interior of an inner cylinder of the filtering assembly through a second connecting pipe.

3. The treatment system for the slag phase after removing iron-aluminum-chromium from leaching solution of laterite nickel ore according to claim 1, wherein the filtering assembly comprises an outer cylinder, an inner cylinder, a liquid collection tank, a first spiral conveyor rod, and a first motor; the outer cylinder is inclined; the inner cylinder is positioned inside the outer cylinder and is coaxial with it; a wall of the inner cylinder is uniformly provided with a plurality of filtration holes for filtering liquid, a lower end of the inner cylinder is connected to the outlet of the material suction component; an upper end of the inner cylinder is connected to the refining module; the liquid collection tank is sleeved over the lower end of the outer cylinder; an opening is provided on the bottom side of the outer cylinder, which is connected to the liquid collection tank; the first spiral conveyor rod is located within the inner cylinder and is rotatably connected to it; the first spiral conveyor rod extends from a bottom to a top of the inner cylinder; a drive shaft of the first motor is connected to the first spiral conveyor rod, enabling the first motor to drive the spiral conveyor rod to rotate inside the inner cylinder; the drive shaft of the first motor is connected to the first spiral conveyor rod for driving the rotation of the first spiral conveyor rod to transport the filter residue to the refining module.

4. The treatment system for the slag phase after removing iron-aluminum-chromium from leaching solution of laterite nickel ore according to claim 1, wherein the refining module comprises a kettle body, a material crushing component, and an abrasive component, the material crushing component and the abrasive component arranged sequentially below a feed inlet of the kettle body; the material crushing component is used to crush the filter residue entering through the feed inlet, while the abrasive component is used to grind the crushed filter residue.

5. The treatment system for the slag phase after removing iron-aluminum-chromium from leaching solution of laterite nickel ore according to claim 4, wherein the material crushing component comprises two crushing rollers and a driving mechanism; the two crushing rollers are arranged side by side and interconnected in a meshing manner; a crushing zone is formed between the two crushing rollers, corresponding to the feed inlet of the kettle body and used for crushing the filter residue; the driving mechanism is used to drive the two crushing rollers to rotate relative to each other.

6. The treatment system for the slag phase after removing iron-aluminum-chromium from leaching solution of laterite nickel ore according to claim 4, wherein a middle section of an outer wall of the kettle body is inwardly concave to form an inwardly tapering cylindrical body; the inwardly tapering cylindrical body is located between the material crushing component and the abrasive component; upper end of the inwardly tapering cylindrical body connects with the inner wall of the kettle body to form a converging passage with a cross-sectional area that decreases sequentially from top to bottom;

lower end of the inwardly tapering cylindrical body connects with the inner wall of the kettle body to form a diverging passage with a cross-sectional area that increases sequentially from top to bottom;

the abrasive component comprises a grinding roller and a third motor; the grinding roller is located within the diverging passage; an outer peripheral surface of the grinding roller is spaced apart from the inner wall of the kettle body to form a grinding area between them; a drive shaft of the third motor is connected to the grinding roller to drive its rotation, thereby refining the filter residue that passes through the grinding area.

7. The treatment system for the slag phase after removing iron-aluminum-chromium from leaching solution of laterite nickel ore according to claim 1, wherein the material guiding drive component comprises a second spiral conveyor rod and a second motor; the second spiral conveyor rod is horizontally disposed within the material pipe; the drive shaft of the second motor is fixedly connected to a central axis of the second spiral conveyor rod to drive the second spiral conveyor rod to rotate and output the filter residue inside the material pipe through its discharge end.

8. The treatment system for the slag phase after removing iron-aluminum-chromium from leaching solution of laterite nickel ore according to claim 7, wherein a material passing cylinder is provided at the outlet end of the material pipe; one side of the material passing cylinder is connected to the material pipe, and its bottom end is connected to the neutralization unit for cyclic leaching ore pulp; a valve is installed within the material passing cylinder, the valve is connected to the measurement module, when the measurement module detects that the pH value reaches a set value, the valve closes.

9. The treatment system for the slag phase after removing iron-aluminum-chromium from leaching solution of laterite nickel ore according to claim 1, wherein the treatment system also comprises a measurement module, the measurement module is connected to the material guiding drive component and the neutralization unit for cyclic leaching ore pulp; the measurement module is used to obtain the pH value of the ore pulp within the neutralization unit for cyclic leaching ore pulp and, when the detected pH value reaches a preset value, to control the material guiding drive component to stop feeding.

10. The treatment system for the slag phase after removing iron-aluminum-chromium from leaching solution of laterite nickel ore according to claim 9, wherein the measurement module comprises a pH detector and a processor; the pH detector is installed in the neutralization unit for cyclic leaching ore pulp to detect the pH value of the ore pulp within the unit; the processor is electrically connected to the material guiding drive component and the pH detector; when the pH value detected by the pH detector is less than a preset value, the second motor operates normally, driving the second spiral conveyor rod to rotate and feed material; when the pH value detected by the pH detector reaches or exceeds the preset value, the processor controls the material guiding drive component to stop operating.

* * * * *